(12) United States Patent
Ekberg et al.

(10) Patent No.: US 8,522,003 B2
(45) Date of Patent: Aug. 27, 2013

(54) SOFTWARE LOADING METHOD AND APPARATUS TO A COMPUTING PLATFORM

(75) Inventors: Jan-Erik Ekberg, Vantaa (FI); Markus Kivila, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 271 days.

(21) Appl. No.: 12/996,829

(22) PCT Filed: Jun. 16, 2008

(86) PCT No.: PCT/FI2008/050365
§ 371 (c)(1),
(2), (4) Date: Mar. 2, 2011

(87) PCT Pub. No.: WO2009/153387
PCT Pub. Date: Dec. 23, 2009

(65) Prior Publication Data
US 2011/0161648 A1    Jun. 30, 2011

(51) Int. Cl.
*G06F 9/00* (2006.01)
*G06F 15/177* (2006.01)

(52) U.S. Cl.
USPC .............. 713/2; 713/1; 713/100; 713/150

(58) Field of Classification Search
USPC ..................... 713/1, 2, 100, 150
See application file for complete search history.

(56) References Cited

U.S. PATENT DOCUMENTS

| | | | |
|---|---|---|---|
| 6,189,100 B1 | 2/2001 | Barr et al. | |
| 6,735,692 B1 * | 5/2004 | Murphrey et al. | 713/1 |
| 6,810,478 B1 * | 10/2004 | Anand et al. | 713/2 |
| 7,069,428 B2 * | 6/2006 | Miyamoto et al. | 713/1 |
| 8,239,686 B1 * | 8/2012 | Hodzic et al. | 713/187 |
| 2003/0115471 A1 * | 6/2003 | Skeba | 713/180 |
| 2003/0233558 A1 | 12/2003 | Lieberman et al. | |
| 2005/0005096 A1 | 1/2005 | Miller | |
| 2005/0149924 A1 | 7/2005 | Komarla et al. | |
| 2005/0160256 A1 | 7/2005 | Huang et al. | |
| 2005/0246518 A1 | 11/2005 | Takahashi | |
| 2006/0136708 A1 * | 6/2006 | Hajji et al. | 713/2 |
| 2006/0155988 A1 | 7/2006 | Hunter et al. | |
| 2009/0288160 A1 * | 11/2009 | Esliger et al. | 726/17 |
| 2011/0161648 A1 * | 6/2011 | Ekberg et al. | 713/2 |

FOREIGN PATENT DOCUMENTS

RU    2005115918 A    11/2006

OTHER PUBLICATIONS

Scott Garriss et al., Towards Trustworthy Kiosk Computing, 8th IEEE Workshop on Mobile Computing Systems and Applications, Mar. 8-9, 2007, a total of 5 sheets.

IBM, A Method for Reliably and Securely Requesting and Reporting Integrity Metrics to the User Interface of a Computing Platform, IP.Com Journal, Jun. 1, 2006, a total of 4 sheets.

* cited by examiner

*Primary Examiner* — Vincent Tran
(74) *Attorney, Agent, or Firm* — Squire Sanders (US) LLP

(57) ABSTRACT

A method and an apparatus that enable loading of computer programs to a trusted computing platform. The computer program loading is enabled by executing a first program loader (21), requesting from a boot server a first program code (22) by the first program loader, wherein the first program code comprises a second program loader, receiving the first program code (23) from the boot server, measuring the second program loader (24), executing the second program loader (25), and requesting from the boot server a second program code (26) by the second program loader.

16 Claims, 2 Drawing Sheets

SOFTWARE LOADING METHOD AND APPARATUS TO A COMPUTING PLATFORM

FIELD OF THE INVENTION

The present invention relates in general to computing and in particular, but not exclusively, to loading computer programs to trusted computing platforms.

BACKGROUND OF THE INVENTION

Diskless devices that boot from a common boot server can be used for example when a consistent software configuration across the devices is desired. A consistent software configuration may reduce the cost associated with system administration and maintenance. Use of diskless devices is also justified in applications, where information does not need to be stored persistently on individual devices. In those scenarios, local persistent storages, such as hard disk drives, represent futile costs.

Downloading boot images from a boot server to a device through a network may involve security risks e.g. in the form of the boot images being tampered with in a manner that makes a device vulnerable to attacks. Therefore, integrity protection of boot files may be needed in order to improve system security.

When using a bootstrapping scheme in a network boot, integrity protection of a boot sequence may be effected such that each of the software entities that are to be loaded and executed during the boot validates the integrity of the next software entity in the sequence before passing the control on to the next entity. If the integrity of each of the entities in the boot sequence has been preserved, the entire boot sequence is deemed to be appropriately protected.

The integrity check of a software entity to be loaded and executed during a boot sequence may be associated with a state of the computing platform resulting from the execution of the software entity. In other words, execution of the software entity puts the platform software and hardware in a particular state. Even if the loaded software entities are similar across devices in a network, computing platform states may vary during a boot sequence due to differences in hardware configurations and combinations of software and hardware. It means that information that is used for checking the integrity of software entities during a boot sequence may have to be determined separately for each device and for each state, as a state depends upon a platform's software and hardware configuration. Such a determination process may be costly and time-consuming.

SUMMARY

The present invention aims at addressing at least some of the issues discussed above. According to a first aspect of the invention there is provided a method comprising the steps of executing a first program loader, requesting from a boot server a first program code by the first program loader, wherein the first program code comprises a second program loader, receiving the first program code from the boot server, measuring the second program loader, executing the second program loader, and requesting from the boot server a second program code by the second program loader.

According to a second aspect the invention provides an apparatus comprising a processor configured to execute a first program loader, request from a boot server a first program code, wherein the first program code comprises a second program loader, receive the first program code from the boot server, measure the second program loader, execute the second program loader, and to request from the boot server a second program code, wherein the apparatus further comprises a memory configured to store the first program loader.

According to a third aspect the invention provides a computer program stored on a memory medium for controlling an apparatus, the computer program comprising computer executable program code configured to cause the apparatus to perform on executing the computer program:
executing a first program loader;
requesting from a boot server a first program code, wherein the first program code comprises a second program loader,
receiving the first program code from the boot server,
measuring the second program loader,
executing the second program loader, and
requesting from the boot server a second program code.

Various exemplary embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may apply to other aspects as well either alone or in combination with other embodiments.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
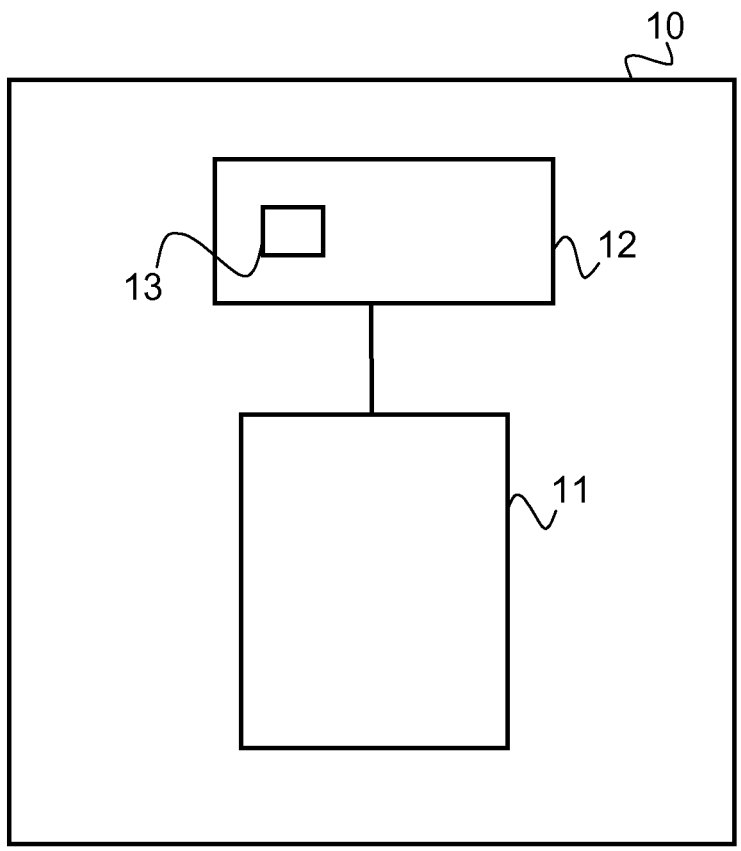
FIG. 1 shows a schematic picture of an apparatus which may provide an implementation platform for at least one embodiment of the invention.

FIG. 1 outlines the structure of an apparatus 10 on which at least one embodiment of the invention may be implemented. The apparatus 10 comprises a processor 11 and a memory 12. The memory 12 may store a computer program 13 that is operable to be loaded into and executed on the processor 11.

The processor 11 may be e.g. a central processing unit (CPU), a microprocessor, a digital signal processor (DSP), a graphics processing unit, or the like. FIG. 1 shows one processor 11, but the apparatus 10 may comprise a plurality of processors. The apparatus 10 may e.g. comprise a baseband processor and an application processor.

The memory 12 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The apparatus 10 may comprise a plurality of memories 12. The memory 12 may be constructed as a part of the apparatus 10 or the processor 11, or it may be inserted into or connected to a slot, port, or the like of the apparatus 10. The memory 32 may serve the sole purpose of storing data, or it may be constructed as a part of an apparatus serving other purposes, such as processing data.

Figure 2:
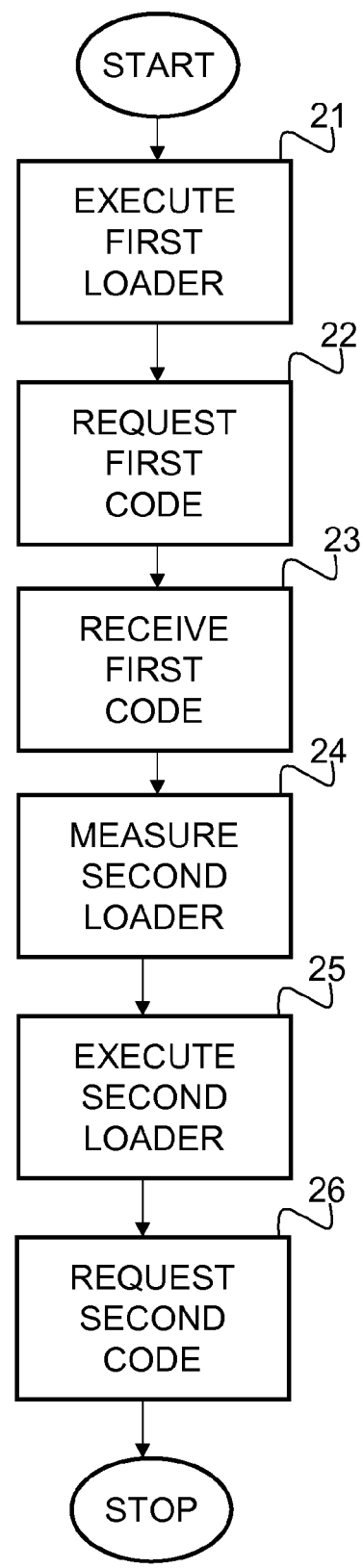
FIG. 2 depicts an example of a method according to an embodiment of the invention.

FIG. 2 illustrates an example of a method according to an embodiment of the invention. A skilled person appreciates that some of the steps depicted in FIG. 2 may not be required in some embodiments of the invention and that it is not necessary to perform the steps in the order shown in FIG. 2. The method according to embodiments of the invention may be carried out e.g. by an apparatus 10 illustrated in FIG. 1.

In step 21, a first program loader may be executed e.g. on the processor 11 of the apparatus 10 of FIG. 1. The first program loader may be stored in the memory 12 of the apparatus 10, and loaded into the processor 11 for execution. The first program loader is shown in FIG. 1 as the computer program 13.

The first program loader may be for example a computer program according to the Preboot eXecution Environment (PXE) specification.

In step 22, the first program loader may request a first program code from a boot server. In case the first program loader is a PXE client, the boot server is a PXE server. The requested first program code may be e.g. Network Bootstrap Program (NBP).

The first program loader may use a suitable protocol for acquiring configuration parameters and for downloading the first program code. For example, a PXE client may use the Dynamic Host Configuration Protocol (DHCP) for requesting and receiving network configuration parameters, such as an Internet Protocol (IP) address, and the Tiny File Transfer Protocol (TFTP) for acquiring the NBP according to the PXE specification. The first program code is received from the boot server in step 23 of FIG. 2.

According to at least one embodiment, the second program code received in step 23 may comprise a second program loader. In step 24, the second program loader may be measured. The second program loader may be measured e.g. by determining a hash value based on the second program loader code using a suitable hash algorithm. Carrying out the measurement may be a prerequisite for execution of the second program loader in some embodiments.

The second program loader may be e.g. a Secure Loader (SL) according to the Dynamic Root of Trust for Measurement (DRTM) scheme. The processor 11 of the apparatus 10 (FIG. 1) may store the second program loader in a cache or the like and send the second program loader code to a trusted platform module for measurement. The trusted platform module may be e.g. a module according to Trusted Computing Group's (TCG) specifications. According to said specifications, a trusted platform module is a coprocessor capable of cryptographic operations, such as signing and hashing. The trusted platform module may be implemented on the apparatus 10 or an apparatus external to the apparatus 10.

The trusted platform module may store a set of configuration register values, such as Platform Configuration Register (PCR) values according to TCG specifications, where the configuration register values may be associated with a particular state of a computing platform, such as the apparatus 10 of FIG. 1. The processor 11 may be configured to reset at least one of the configuration register values e.g. in conjunction with initialization of the processor 11 and loading the second program loader into the cache of the processor 11.

In step 25 of FIG. 2, the second program loader may be executed e.g. on the processor 11 of the apparatus 10. The second program loader, such as the Secure Loader of the DRTM scheme, may be configured to take control of the processor 10, temporarily freeze the operation of the processor 10, and perform a security check on the processor and on itself. Therefore, the second program loader may serve as a starting point for a chain of trust in a trusted and/or secure boot process.

In step 26 of FIG. 2, the second program loader may request a second program code from the boot server. The second program code may comprise e.g. computer programs associated with an operating system of a device.

The method according to at least one embodiment illustrated in FIG. 2 may further comprise the step of extending a configuration register value with a result of the measuring of the second program loader. A configuration register value may be extended e.g. by appending a new value to a previous value. The extended value may also be a result of a hash operation, where a new value is concatenated to a previous value, and the resulting data is passed trough a hash process. The new configuration register value is the outcome of the hash process.

As described hereinbefore, a trusted platform module may store and maintain a set of configuration register values, and a processor may be configured to reset at least one of the configuration register values. The trusted platform module may also be arranged to extend at least one configuration value by a result of a measurement of a program code. For example, a hash value may be appended to a previous configuration register value.

For example, a trusted platform module may store and maintain a set of PCR values, and a processor may be configured to reset a particular PCR value, such as PCR 17. The processor may set PCR 17 to 0, and the trusted platform module may extend PCR 17 by the hash value acquired from the measurement of the second program loader. In this way, the value of PCR 17 may be made to correspond to the current state of a boot process, for example.

The first program code received in step 23 of FIG. 2 may further comprise a trusted module emulator, and the method according to at least one embodiment may further comprise the step of measuring the trusted module emulator using the second program loader. The trusted module emulator may be e.g. an emulator of a Mobile Trusted Module (MTM). The Mobile Trusted Module is described in detail in TCG specifications.

The second program loader may measure the trusted module emulator or send the trusted module emulator code to the trusted platform module for measurement by the trusted platform module. The trusted platform module may extend a configuration register value by the value acquired by measuring the trusted module emulator code. For example, the trusted module emulator may extend the same configuration register value that was earlier extended by the result of the measuring of the second program loader. The trusted platform module may e.g. extend the PCR 17 value by the measurement of the trusted module emulator.

The trusted module emulator may comprise a particular state, i.e. the emulator may have been set to be in a particular state, and the first program code received in step 23 of FIG. 23 may further comprise information of said particular state. In this case the method according to at least one embodiment may further comprise the steps of acquiring said state information and modifying at least one configuration register value associated with said particular state according to said state information. The state information may comprise for example a root verification key and configuration register values corresponding to the particular state.

For example, the trusted module emulator may comprise a state where the corresponding configuration register values are other than initial values. Said state may e.g. represent the situation in which the trusted module emulator can begin the processing of computer program entities that are downloaded after the trusted module emulator executed. In the case of PCRs, at least one of PCRs 0 to 16 may have a value other than 0. In this case the second program loader may acquire the configuration register values from the first program code and modify corresponding values of the configuration register value set maintained by the trusted platform module to reflect the current state of the trusted module emulator. In this case the configuration register values associated with the particular state that the trusted module emulator comprises are not extended, but set to the values acquired from the first program code.

The state information may be encrypted with a key stored by the trusted platform module. The encryption key may have been sealed to a particular configuration register value such that the encryption key is available only when the computing platform is in an expected state. The seal may be e.g. an expected configuration register value corresponding to the expected state. For example, the encryption key may be available only when PCR 17 has a predetermined value after the PCR 17 has been extended by the measurements of the second program loader and/or the trusted module emulator.

Once the trusted platform module has released the encryption key, it can be used to decrypt the state information included in the first program code.

The second program code requested in step 26 of FIG. 2 may comprise e.g. computer programs associated with an operating system of a device. The method according to at least one embodiment may further comprise the steps of executing the trusted module emulator e.g. on the processor 11 of the apparatus 10 (FIG. 1), measuring the computer programs using the trusted module emulator, and verifying the computer programs on the basis of the measuring results.

For example, the trusted module emulator may be used to verify the integrity of the further computer program entities that are downloaded after the trusted module emulator executed. The downloaded computer program entities may be accompanied by integrity certificates, such as Reference Integrity Metrics (RIM) certificates according to TCG specifications, that can used for verifying the integrity of the computer program entities. The integrity certificates may include expected value(s) of configuration register(s) that result from the extension of said values by the measurements of said computer program entities. In other word, the integrity certificates may authorize a particular change in the configuration register values and therefore also a particular transition in the state of a computing platform. The trusted module emulator may verify the integrity of the downloaded computer program entities by comparing the results of the measurements of said entities against the expected values included in the integrity certificates.

The trusted module emulator may use the trusted platform module, and the stored set of configuration register values in particular, for verification purposes. The trusted module emulator may e.g. use the processing resources of the trusted platform module for measuring a downloaded computer program entity and allow the execution of the computer program entity, if the execution results in a state authorized by an integrity certificate, such as a RIM certificate, associated with the computer program entity and the resulting state change. If the state change is authorized, the trusted module emulator may allows the execution of the computer program entity and extend the corresponding configuration register value(s) stored and maintained by the trusted platform module. The trusted module emulator may also measure downloaded computer program entities itself.

The embodiments of the method and apparatus described herein may be suitable for enabling a trusted and/or secure boot process on e.g. a diskless device. The embodiments utilize the resources of a trusted platform module, for example a module according to TCG specifications. The embodiments may establish a chain of trust for a boot process, where the chain of trust originates from a program loader according to the DRTM scheme. According to the embodiments of the invention, a plurality of devices may utilize a common Network Bootstrap Program without the need for determining a chain of device-specific boot stages and their authorizing information separately for each device.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
executing a first program loader;
requesting from a boot server a first program code by the first program loader, wherein the first program code comprises a second program loader;
receiving the first program code from the boot server;
measuring the second program loader;
executing the second program loader;
extending a configuration register value with a result of the measuring of the second program loader; and
requesting from the boot server a second program code by the second program loader.

2. A method according to claim 1, wherein the first program code further comprises a trusted module emulator, and wherein the method further comprises:
measuring the trusted module emulator using the second program loader.

3. A method according to claim 2, wherein the method further comprises:
extending a configuration register value with a result of the measuring of the trusted module emulator.

4. A method according to claim 2, wherein the trusted module emulator comprises a particular state and the first program code further comprises state information of said particular state, and wherein the method further comprises:
acquiring said state information; and
modifying a configuration register value associated with said particular state according to said state information.

5. A method according to claim 4, wherein the state information comprises a root verification key and the configuration register value.

6. A method according to claim 4, wherein the state information is in encrypted form, the state information having been encrypted with an encryption key, and wherein the method further comprises:
acquiring the encryption key from a trusted platform module; and
decrypting the state information using the encryption key.

7. A method according to claim 6, wherein the encryption key is available in case the configuration register value extended with a result of the measuring of the trusted module emulator corresponds to a state stored as a seal in the trusted platform module.

8. A method according to claim 2, wherein the second program code comprises a computer program, and the method further comprises:
- executing the trusted module emulator;
- measuring the computer program by the trusted module emulator; and
- verifying the computer program on a basis of a result of said measuring.

9. A method according to claim 8, wherein the verifying of the computer program comprises comparing a result of said measuring against a value included in an integrity certificate.

10. An apparatus comprising: a processor configured to:
- execute a first program loader;
- request from a boot server a first program code, wherein the first program code comprises a second program loader;
- receive the first program code from the boot server;
- measure the second program loader;
- extend a configuration register value with a result of the measuring of the second program loader;
- execute the second program loader; and to
- request from the boot server a second program code; wherein the apparatus further comprises:
- a memory configured to store the first program loader.

11. An apparatus according to claim 10, wherein the first program code further comprises a trusted module emulator, and wherein the processor is further configured to:
- measure the trusted module emulator using the second program loader.

12. An apparatus according to claim 11, wherein the processor is further configured to:
- extend the configuration register value with a result of the measuring of the trusted module emulator.

13. An apparatus according to claim 11, wherein the trusted module emulator comprises a particular state and the first program code further comprises information of said particular state, and wherein the processor is further configured to:
- acquire said state information; and to
- modify a configuration register value associated with said particular state according to said state information.

14. An apparatus according to claim 13, wherein the state information is in encrypted form, the state information having been encrypted with an encryption key, and wherein the processor is further configured to:
- acquire the encryption key from a trusted platform module; and to
- decrypt the state information using the encryption key.

15. An apparatus according to claim 11, wherein the second program code comprises a computer program, and the processor is further configured to:
- execute the trusted module emulator;
- measure the computer program by the trusted module emulator; and to
- verify the computer program on the basis of a result of said measuring.

16. A non-transitory computer program stored on a memory medium for controlling an apparatus, the computer program comprising computer executable program code configured to cause the apparatus to perform on executing the computer program a method comprising:
- executing a first program loader;
- requesting from a boot server a first program code by the first program loader, wherein the first program code comprises a second program loader;
- receiving the first program code from the boot server;
- measuring the second program loader;
- executing the second program loader;
- extending a configuration register value with a result of the measuring of the second program loader; and
- requesting from the boot server a second program code by the second program loader.

* * * * *